United States Patent [19]

Hirai

[11] Patent Number: 5,605,955
[45] Date of Patent: Feb. 25, 1997

[54] SILICONE RUBBER COMPOSITION

[75] Inventor: Kazuo Hirai, Sodegaura, Japan

[73] Assignee: Dow Corning Toray Silicone Co., Ltd., Tokyo, Japan

[21] Appl. No.: 531,021

[22] Filed: Sep. 20, 1995

[30] Foreign Application Priority Data

Sep. 30, 1994 [JP] Japan ................................ 6-261955

[51] Int. Cl.$^6$ ................................................. C08G 77/12
[52] U.S. Cl. ......................... 524/588; 524/862; 528/24; 528/26; 528/31
[58] Field of Search ............................. 528/24, 31, 26; 524/862, 508

[56] References Cited

U.S. PATENT DOCUMENTS 3,889,023  6/1975  Plueddemann ........................ 428/429
5,032,626  7/1991  Evans ..................................... 528/207

FOREIGN PATENT DOCUMENTS 1121230  4/1982  Canada .

Primary Examiner—Ralph H. Dean
Attorney, Agent, or Firm—William F. Boley

[57] ABSTRACT

A silicone rubber composition which has excellent adhesion to various substrate materials with which it is in contact during its curing. The silicone rubber composition comprises an adhesion promoter comprising an addition reaction product or a reaction mixture of (i) a carboxylic acid ester described by general formula $$(C_6H_{6-x}) \left[ \begin{array}{c} O \\ \| \\ -C-O-R^2 \end{array} \right]_x ,$$

where $R^2$ is an alkenyl group and x is a number of 1 to 6, and (ii) an alkoxysilane expressed by general formula $$\begin{array}{c} R^3_{(3-a)} \\ | \\ HSi(OR^4)_a , \end{array}$$

where $R^3$ is a monovalent hydrocarbon group which does not contain aliphatic unsaturated linkage, $R^4$ is an alkyl group, and a is a number of 1 to 3.

16 Claims, No Drawings

SILICONE RUBBER COMPOSITION

BACKGROUND OF INVENTION

The present invention relates to a silicone rubber composition, and specifically, it relates to a silicone rubber composition which shows excellent adhesion to various substrate materials with which it is in contact during its curing.

Silicone rubber compositions comprising organopolysiloxane and organic peroxide cures quickly-to form silicone rubber when heated, but there has been a problem that their adhesion to substrate materials such as metal, plastic, glass, etc. is poor. To overcome this problem it has been proposed, for example, a silicone rubber composition compounded with diallylphthalate (JP (Kokai) 49-99650), a silicone rubber composition compounded with 3-methacryloxypropyltrimethoxysilane (JP (Kokai) 55-34993), and a silicone rubber composition compounded with triallyltrimellitate (JP (Kokai) 62-30151) as the silicone rubber compositions with improved adhesion to various substrates.

However, the adhesion of the silicone rubber compositions proposed in JP (Kokai) 49-99650 and JP (Kokai) 62-30151 is not sufficient, and also, the compatibility of diallylphthalate and triallyltrimellitate with the organopolysiloxane is low. In addition, there has been a problem that these constituents tend to bleed out of these compositions and cured silicone rubber during storage. Also, the silicone rubber composition proposed in JP (Kokai) 55-34993 has a problem in that its adhesion is not sufficient.

The present inventor has carried out intensive studies on the aforesaid subject matters, and as a result, reached the present invention. Namely, the objective of the present invention is to present a silicone rubber composition which has excellent adhesion to various substrate materials.

SUMMARY OF INVENTION

A silicone rubber composition which has excellent adhesion to various substrate materials with which it is in contact during its curing. The silicone rubber composition comprises an adhesion promoter comprising an addition reaction product or a reaction mixture of (i) a carboxylic acid ester described by general formula

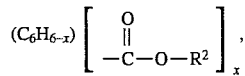

where $R^2$ is an alkenyl group and x is a number of 1 to 6, and (ii) an alkoxysilane expressed by general formula

where $R^3$ is a monovalent hydrocarbon group which does not contain aliphatic unsaturated linkage, $R^4$ is an alkyl group, and a is a number of 1 to 3.

DESCRIPTION OF INVENTION

The present invention relates to a silicone rubber composition comprising:

(A) 100 parts by weight of an organopolysiloxane described by average unit formula

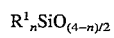

where $R^1$ is a substituted or an unsubstituted monovalent hydrocarbon group, and n is a number of 1.9 to about 2.1, (B) 0.1 to about 10 parts by weight of an organic peroxide, (C) 0.1 to about 10 parts by weight of and addition reaction product or a reaction mixture of (i) a carboxylic acid ester described by general formula

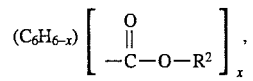

where $R^2$ is an alkenyl group and x is a number of 1 to 6, and (ii) an alkoxysilane described by general formula

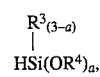

where $R^3$ is a monovalent hydrocarbon group which does not contain aliphatic unsaturated linkage, $R^4$ is an alkyl group, and a is a number of 1 to 3, and optionally a silicone rubber composition compounded with (D) 1 to about 300 parts by weight of a reinforcing filler with a specific surface area of 50 $m^2$/g or greater.

In the following, the silicone rubber composition of the present invention is explained in detail.

The (A) constituent, organopolysiloxane, is the principal constituent of the present composition, and expressed by the average unit formula: $R^1_n SiO_{(4-n)/2}$. In the above formula, $R^1$ is a substituted or an unsubstituted monovalent hydrocarbon group, for example, it can be an alkyl group such as methyl, ethyl, propyl, butyl, pentyl, and hexyl; an alkenyl group such as vinyl, allyl, butenyl, pentenyl, and hexenyl; an aryl group such as phenyl, tolyl, xylyl, and naphthyl; a cycloalkyl group such as cyclopentyl and cyclohexyl; an aralkyl group such as benzyl or phenethyl; or a halogenated alkyl group such as 3-chloropropyl and 3,3,3-trifluoropropyl. Preferably $R^1$ is methyl, vinyl, phenyl, or 3,3,3-trifluoropropyl. Also, in the aforesaid formula, a is a number in the range of 1.9 to about 2.1. The (A) constituent is expressed by the aforesaid average unit formula, and the constituting siloxane unit can be, for example $R^1_3SiO_{1/2}$, $R^1_2(OH)SiO_{1/2}$, $R^1_2SiO_{2/2}$, $R^1SiO_{3/2}$, and $SiO_{4/2}$. The (A) constituent is the polymer which contains $R^1_2SiO_{2/2}$ units and $R^1_3SiO_{1/2}$ units or $R^1_2(OH)SiO_{1/2}$ units as its essential units, and depending on the situation, it can contain a small amount of $R^1SiO_{3/2}$ and/or $SiO_{4/2}$. Also, the (A) constituent can be a mixture of two or more polymers.

There is no particular limitation for the molecular structure of the (A) constituent, and for example, it can be a straight chain or a partially branched straight chain, and preferably it should be a straight chain. The (A) constituent can be, for example, trimethylsiloxy-capped dimethylpolysiloxane, trimethylsiloxy-capped methylvinylpolysiloxane, trimethylsiloxy-capped methylphenylpolysiloxane, trimethylsiloxy-capped dimethyisiloxane-methylvinylsiloxane copolymer, trimethylsiloxy-capped dimethylsiloxane-methylphenylsiloxane copolymer, trimethylsiloxy-capped dimethylsiloxane-methyl(3,3,3-trifluoropropyl)siloxane copolymer, trimethylsiloxy-capped dimethylsiloxane-methylvinylsiloxane-methylphenylsiloxane copolymer, dimethylvinylsiloxy-capped dimethylpolysiloxane, dimethylvinylsiloxy-capped methylvinylpolysiloxane, dimethylvinylsiloxy-capped methylphenylpolysiloxane, dimethylvinylsiloxy-capped dimethylsiloxane-methylvinylsiloxane copolymer, dimethylvinylsiloxy-capped dimethylsiloxane-methylphenylsiloxane copolymer, dimethylvinylsiloxy-capped dimethylsiloxane-methyl(3,3,3-trifluoropropyl)siloxane copolymer, dimethylvinylsiloxy-capped dimethylsiloxane-methylvinylsiloxane-methylphenylsiloxane copolymer, silanol-capped dimethylpolysiloxane, silanol-capped methylvinylpolysiloxane, silanol-capped methylphenylpolysiloxane, silanol-capped dimethylsiloxane-methylvinylsiloxane copolymer, silanol-capped dimethylsiloxane-methylphenylsiloxane copolymer, silanol-capped dimethylsiloxane-methyl(3,3,3-trifluoropropyl)siloxane copolymer, silanol-capped dimethylsiloxane-methylvinylsiloxane-methylphenylsiloxane copolymer, trimethoxysiloxy-capped dimethylpolysiloxane, trimethoxysiloxy-capped dimethylsiloxane-methylvinylsiloxane copolymer, trimethoxysiloxy-capped dimethylsiloxane-methylphenylsiloxane copolymer, and trimethoxysiloxy-capped dimethylsiloxane-methylvinylsiloxane-methylphenylsiloxane copolymer. In the present composition, these organopolysiloxanes can be compounded individually, or as a mixture of more than one kind as the (A) constituent.

There is no particular limitation for the viscosity at 25° C. of the (A) constituent, and in practical use it is preferably higher than 10,000 centistokes, and more preferably it is higher than 1,000,000 centistokes, and most preferably it should be in the range of 5,000,000 to about 50,000,000 centistokes. This is because, if an organopolysiloxane having a viscosity lower than 10,000 centistokes at 25° C. is used as the (A) constituent, the mechanical strength of the silicone rubber obtained is reduced. In order to obtain high strength silicone rubber, it is recommended to use organopolysiloxane of a viscosity higher than 1,000,000 centistokes at 25° C. Also, when an organopolysiloxane having a viscosity higher than 1,000,000 centistokes at 25° C. is used as the (A) constituent, the silicone rubber composition obtained is in putty-form. This is advantageous since the silicone rubber composition is not squeezed out between substrates even when pressure bonded between the substrates. Also, the Silicone rubber composition can be applied as an adhesive in string-form, tape-form, sheet-form or film-form.

The (B) constituent, organic peroxide, functions as the curing agent of the present composition, and there is no particular limitation for such organic peroxide. The (B) constituent can be, for example, hydroperoxide such as t-butylhydroxyperoxide ($\tau$=264° C.), cumenehydroperoxide ($\tau$=255° C.), di-i-propylbenzenehydroperoxide ($\tau$=205° C.), p-menthanehydroperoxide ($\tau$=216° C.), 2,5-dimethyl-2,5-dihydroperoxide ($\tau$=257° C.), 2,5-dimethyl-2,5-dihydroperoxy-3-hexyne ($\tau$=264° C.), and pinenehydroperoxide ($\tau$=229° C.); dialkylperoxide such as di-isobutylperoxide ($\tau$=89° C.), di-t-butylperoxide ($\tau$=193° C.), di-t-amylperoxide ($\tau$=190° C.), t-butylcumylperoxide ($\tau$=178° C.), dicumylperoxide ($\tau$=171° C.), 2,5-dimethyl-2,5dimethyl-2,5-di(t-butylperoxy)hexane ($\tau$=179° C.)2,5-di(t-butylperoxy)-3-hexyne ($\tau$=193° C.), $\alpha,\alpha'$-bis(t-butylperoxy)-di(i-butylperoxy)benzene ($\tau$=182° C.), 1,1-bis(t-butylperoxy)-3,3,5-trimethylcyclohexane ($\tau$=153° C.), n-butyl-4,4'-bis(t-butylperoxy)valerate ($\tau$=165° C.), 2,2-bis(4,4-di-t-butylperoxycyclohexyl)propane ($\tau$=154° C.), 2,2-bis-(t-butylperoxy)butane ($\tau$=199° C.), and 1,1-di-(t-butylperoxy)cyclohexane ($\tau$=153° C.); diacylperoxide such as caprylperoxide ($\tau$=114° C.), lauroylperoxide ($\tau$=115° C.), stearoylperoxide ($\tau$=114° C.), succinylperoxide ($\tau$=144° C.), benzoylperoxide ($\tau$=133° C.), p-chlorobenzoylperoxide ($\tau$=133° C.), o-chlorobenzoylperoxide ($\tau$=118° C.), 2,4-dichlorobenzoylperoxide ($\tau$=112° C.), and octanoylperoxide ($\tau$=116° C.); peroxyester such as t-butylperoxyacetate ($\tau$=159° C.), t-butylperoxy-2-ethylhexanoate ($\tau$=135° C.), t-butylperoxylaurate ($\tau$=165° C.), t-butylperoxybenzoate ($\tau$=166° C.), di-t-butyldiperoxyphthalate ($\tau$=159° C.), 2,5-dimethyl-2,5-di(benzoylperoxy)hexane ($\tau$=162° C.), t-butylperoxymaleate ($\tau$=148° C.), t-butylperoxy-i-propylcarbonate ($\tau$=158° C.), t-butylperoxypivalate ($\tau$=110° C.), and t-butylperoxyneodecanoate ($\tau$=101° C.); peroxydicarbonate such as diisopropylperoxydicarbonate ($\tau$=88° C.) and di-2-ethylhexylperoxydicarbonate ($\tau$=91° C.); and ketoneperoxide. The $\tau$ in parenthesis shows the decomposition temperature at which the half-life of the organic peroxide is 1 minute.

In the present composition, the organic peroxide can be compounded individually or as a mixture of two or more kinds as the (B) constituent. Also, in the present invention, it is preferable to use an organic peroxide having a decomposition temperature ($\tau$) of 125° C. or lower. This is because a silicone rubber composition in which the organic peroxide has a decomposition temperature ($\tau$) lower than 125° C., can be bonded strongly to a substrate, which is relatively less heat resistant, under moderate condition, for example, below 125° C., and preferably at 70° to about 120° C.

The compounding amount of the (B) constituent is in the range of 0.1 to about 10 parts by weight per 100 parts by weight of the (A) constituent, and preferably in the range of 0.5 to about 5 parts by weight. If the compounding amount of the (B) constituent is less than 0.1 part by weight per 100 parts by weight of the (A) constituent, the curability of the composition obtained is drastically degraded. If the compounding amount of the (B) constituent exceeds 10 parts by weight, the silicone rubber obtained becomes too hard.

The (C) constituent is the constituent which adds adhesion to the present composition, and is an addition reaction product or a reaction mixture of (i) a carboxylic acid ester described by general formula

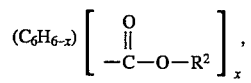

where $R^2$ is an alkenyl group and x is a number of 1 to 6, and (ii) an alkoxysilane described by general formula

where $R^3$ is a monovalent hydrocarbon group which does not contain aliphatic unsaturated linkage, $R^4$ is an alkyl group, and a is a number of 1 to 3.

In the (i) constituent, $R^2$ in the formula is an alkenyl group, and can be, for example, vinyl, allyl, isopropenyl, butenyl, pentenyl, hexenyl, or heptenyl. Preferred is when $R^2$ is allyl. Also in the formula, x is a number of 1 to 6, and preferably 3 or 4.

The (i) constituent can be, for example, allylbenzoate, diallylterebhthalate, diallylisophthalate, triallyltrimellitate, tetraallytpyromellitate, isopropenylbenzoate, diisopropenylterephthalate, diisopropenylisophthalate, diisopropenylphthalate, triisopropenyltrimellitate, tetraisopropenylpyromellitate, tributenyltrimellitate, tripentenyltrimellitate, trihexenyltrimellitate, triheptenyltrimellitate, tetrabutenylpyromellitate, tetrapentenyltrimellitate, tetrahexenylpyromellitate, tetraheptenylpyromellitate, or hexaallylmellitate, and preferred are triallyltrimellitate and tetraallylpyromellitate.

In the (ii) constituent, $R^3$ in the formula is a monovalent hydrocarbon group which does not contain aliphatic unsaturated linkage and it can be, for example, an alkyl group such as methyl, ethyl, propyl, butyl, pentyl, and hexyl; an aryl group such as phenyl, tolyl, xylyl, and naphthyl; a cycloalkyl group such as cyclopentyl and cyclohexyl; or an aralkyl group such as benzyl and phenethyl. Preferred is when $R^3$ is methyl or phenyl. Also, in the formula, $R^4$ is an alkyl group, for example, methyl, ethyl, propyl, butyl, pentyl, or hexyl. Preferred is when $R^4$ is methyl or ethyl because they give good adhesive properties. Also, in the formula, a is a number of 1 to 3, and in order to give good adhesive properties a is preferably 3.

The (ii) constituent can be, for example, trimethoxysilane, triethoxysilane, tripropoxysilane, tributoxysilane, methyldimethoxysilane, methyldiethoxysilane, ethyldimethoxysilane, phenyldimethoxysilane, or methylphenylmethoxysilane. Preferred is when the (ii) constituent is trimethoxysilane or triethoxysilane.

The (C) constituent is prepared by the addition reaction of the (i) constituent and the (ii) constituent. There is no particular limitation for the method of preparation of the (C) constituent, and for example, it is preferable to carry out the addition reaction of the (i) constituent and the (ii) constituent in the presence of a hydrosilylation reaction catalyst. This hydrosilylation reaction catalyst can be, for example, a platinum based catalyst, a rhodium based catalyst, or a palladium based catalyst. Preferred is a platinum based catalyst such as platinum metal, platinum black, silica fine powder-supported platinum, activated carbon powder-supported platinum, chloroplatinic acid, an alcohol solution of chloroplatinic acid, a complex of platinum and an olefin, and a complex of platinum and vinylsiloxane. There is no particular limitation in the amount of the (i) constituent and the (ii) constituent reacted. Preferably for each one alkenyl group provided by the (i) constituent there should be to 0.01 to about 5 moles of the (ii) constituent. Even more preferred is one alkenyl group provided by the (i) constituent per 0.01 to about 0.9 moles of the (ii) constituent, since the adhesion of the silicone rubber composition obtained is improved by carrying out the addition reaction with an excess of the (ii) constituent relative to the alkenyl groups provided by the (i) constituent. The (C) constituent is obtained as the reaction mixture, and this can be compounded in the present silicone rubber composition, or else the addition reaction product may be separated and compounded into the present silicone rubber composition.

The (C) constituent is a carboxylic acid ester which contains alkoxy groups bonded to silicon atoms and can be describe, for example, by general formula

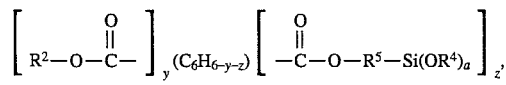

where $R^2$ is an alkenyl group, $R^3$ is a monovalent hydrocarbon group which does not contain aliphatic unsaturated linkage, $R^4$ is an alkyl group, $R^5$ is an alkylene group, a is a number of 1 to 3, y is a number of 0 to 5, z is a number of 1 to 6, and y+z is a number of 1 to 6; or the (C) constituent is a reaction mixture in which this is the principal component. Since the (C) constituent is compatible with the silicone rubber composition, it does not bleed out of the aforesaid composition or silicone rubber in storage, and also, it provides for excellent adhesion to various substrate materials. In the formula, $R^2$, $R^3$, and $R^4$ can be the same groups as described before. $R^5$ is an alkylene group, for example, ethylene, propylene, butylene, pentylene, or hexylene.

The compounding amount of the (C) constituent is in the range of 0.1 to about 10 parts by weight per 100 parts by weight of the (A) constituent, and preferably in the range of 0.2 to about 5 parts by weight. If the compounding amount of the (C) constituent is less than 0.1 part by weight per 100 parts by weight of the (A) constituent, the adhesion of the composition obtained is drastically degraded. If the (C) constituent exceeds 10 parts by weight, the adhesion is not greatly improved, but the storage stability of the composition obtained is degraded.

It is preferable to compound reinforcing filler of a specific surface area of 50 $m^2/g$ or greater as a (D) constituent, in addition to the aforesaid (A) constituent through (C) constituent to the silicone rubber composition of the present invention. The (D) constituent can be, for example, fumed silica, wet method silica, and fumed titanium oxide. The reinforcing fillers can be made hydrophobic by treatment of their surface with organoalkoxysilane, organochlorosilane, organosilazane, organopolysiloxane, or organocyclosiloxane. It is necessary that the specific surface area of the (D) constituent be 50 $m^2/g$ or greater, and it is preferable it be 100 $m^2/g$ or greater. Two or more kinds of these reinforcing fillers can be compounded as a mixture into the present composition.

In the present composition, the compounding amount of the (D) constituent is in the range of 1 to about 300 parts by weight per 100 parts by weight of the (A) constituent, and more preferably in the range of 10 to about 200 parts by weight. If the compounding amount of the (D) constituent is less than 1 part by weight per 100 parts by weight of the (A) constituent, the effect of the reinforcing filler in the silicone rubber obtained is insignificant. If the reinforcing filler exceeds 300 parts by weight, the handling workability of the silicone rubber composition obtained is degraded.

Also, in the present composition, non-reinforcing filler can be compounded as an optional constituent. Such non-reinforcing filler can be, for example, baked silica, pulverized quartz, fused silica, titanium oxide, iron oxide, aluminum oxide, zinc oxide, magnesium oxide, zinc carbonate, magnesium carbonate, calcium carbonate, silicon nitride, aluminum nitride, boron nitride, aluminum hydroxide, diatomaceous earth, calcium silicate, magnesium silicate, aluminum silicate, mica, talc, clay, bentonite, hollow glass beads, molten glass beads, pulverized glass, glass fiber, carbon fiber, polyester fiber, polytetrafluoroethylene resin powder, and poly(vinyl chloride) resin powder; and also the non-reinforcing filler obtained by hydrophobic treatment of these fillers by organosilicon compounds such as organoalkoxysilane, organochlorosilane, organosilazane, organopolysiloxane, and organocyclosiloxane. In the present composition, these non-reinforcing filler can be compounded as a mixture of two or more kinds.

In the present composition, compounded as another optional constituent can be an adhesion promoter such as 3-mercaptopropyltrimethoxysilane, 3-mercaptopropylmethyldimethoxysilane, N-(2-aminoethyl)-3-aminopropyltrimethoxysilane, 3-aminopropyltrimethoxysilane, 3-aminopropyltriethoxysilane,
3-methacryloxypropyltrimethoxysilane, 3-methacryloxypropylmethyldimethoxysilane, 3-glycidoxypropyltrimethoxysilane, 3-glycidoxypropylmethyldimethoxysilane, 2-(3,4-epoxycyclohexyl)ethyltrimethoxysilane, and vinyltrimethoxysilane, allyltrimethoxysilane.

Other optional constituents in the present silicone rubber composition include, heat resistance improving agents such as titanium oxide, iron oxide red, iron oxide black, iron oxide yellow, cerium oxide, cerium silanolate, cerium salt of fatty acid, iron octylate, and barium zirconate; flame retardants such as carbon black, benzotriazole, zinc carbonate, manganese carbonate, platinum compound, and antimony oxide; plasticizers such as phthalate, adipate, maleate, fumarate, and phosphate; processing aids such as stearic acid, sodium stearate, fatty acid esters, and fatty acid amides; and foaming agents.

The silicone rubber composition of the present invention is prepared by uniformly mixing the aforesaid (A) constituent through (C) constituent, and other optional constituents by a kneading machine such as kneader-mixer, Banbury mixer, or two-roll mill. Also, if the silicone rubber composition is in putty-form, it can be processed to a desired form such as a string, tape, film, or sheet by a processing machine such as a calender roll, laminate roll, or extruder. Also, in this case, it is preferable to protect the silicone rubber composition with polyethylene film or polypropylene film from adhesion degradation.

There is no particular limitation for the curing conditions of the silicone rubber composition of the present invention, and the heating temperature is required to be the temperature at which the (B) constituent functions sufficiently as the curing agent. For example, for an organic peroxide having a decomposition temperature lower than 125° C., when the half-life is 1 minute, the heating temperature is lower than 125° C., and preferably 70° to about 120° C. When an organopolysiloxane having a viscosity higher than 1,000,000 centistokes at 25° C. is used as the (A) constituent, the silicone rubber composition obtained is in putty-form, and this can be processed to string-form, tape-form, film-form, or sheet-form. Also, after the silicone rubber composition in putty-form is pressure bonded to the substrate material, even if it is pressurized to some extent, it is not squeezed out of the bonded area, and it is bonded strongly to various substrate materials.

The silicone rubber composition of the present invention shows excellent adhesion to various substrate materials, for example, metals such as iron, stainless steel, aluminum, nickel, and copper; plastics such as acrylic resin, polyamide resin, polystyrene resin, polyester resin, epoxy resin, and polybutyleneterephthalate resin; ceramic; and glass. In particular, in the case where an organic peroxide having a decomposition temperature lower than 125° C., when the half-life is 1 minute, is compounded as the (B) constituent, strong bonding can be achieved at such relatively low temperature as below 125° C., preferably 70° to about 120° C., and therefore, it is suitable for adhesion to plastic which is relatively less heat resistant. Also, in the case where an organopolysiloxane having a viscosity higher than 1,000,000 centistokes at 25° C. is used as the (A) constituent, the silicone rubber composition obtained is in putty-form, and this does not flow out even if it is pressure bonded to the substrate. In such a case the silicone rubber composition can be used in string, tape, film, or sheet-form as a sealant in the civil engineering and construction industry, in electrical applications, in electronic parts, and as a FIPG material in the automobile industry.

The silicone rubber composition of the present invention is explained in detail by the following Examples. The viscosity in the Examples is the value measured at 25° C.

EXAMPLE 1

100 parts by weight of a dimethylvinylsiloxy-capped dimethylsiloxane-methylvinylsiloxane copolymer having a viscosity of 10,000,000 centistokes (molar ratio of dimethylsiloxane unit and methylvinylsiloxane unit was 99.84/0.16) and 50 parts by weight of hydrophobic fumed silica having a specific surface area of 100 m²/g were mixed while heating at 170° C. for 1 hour using a kneader-mixer, and a base compound was prepared. 100 parts by weight of this base compound, 1.25 parts by weight of 2,4-dichlorobenzoylperoxide, and 1.3 parts by weight of a reaction mixture prepared by the addition reaction of 1 mole of tetraallylpyromellitate and 1 mole of trimethoxysilane in the presence of platinum catalyst, were uniformly mixed with a two-roll mill, and the silicone rubber composition of the present invention was obtained. This silicone rubber composition was in putty-form.

Using a hot press, this silicone rubber composition was cured at 120° C. for 10 minutes to form a silicone rubber sheet 2 mm thick. The physical properties of this silicone rubber sheet was measured following the physical testing method for vulcanized rubber specified in JIS K 6301.

Also the silicone rubber composition was extruded using an extruder, and a silicone rubber composition film 1.0 mm thick and 10 cm wide was prepared. The silicone rubber composition film was sandwiched between a glass plate (5 mm×25 mm×100 mm) and stainless steel (SUS304) plate (1 mm×25 mm×60 mm) in such a way that the contact area was 25 mm×10 mm. The sandwiched silicon rubber composition was heated in a hot press for one minute at a temperature of 120° C. and at a pressure of 4 kg/cm². Fabricated was a test piece having the glass plate and the stainless steel plate bonded with silicone rubber. The bonding strength of this test piece was measured according to the tensile-shear bonding strength test method for adhesives specified in JIS K 6850. These results are shown in Table 1.

Comparison example 1

A silicone rubber composition was prepared by the same procedure as described in Example 1 except that 3-methacryloxypropyltrimethoxysilane was used instead of the reaction mixture prepared by the addition reaction of 1 mole of tetraallylpyromellitate with one mole of trimethoxysilane. This silicone rubber composition was cured by the same procedure as described in Example 1, and the physical properties and the bonding strength of the silicone rubber obtained were measured. These results are shown in Table 1.

Comparison example 2

A silicone rubber composition was prepared by the same procedure as described in Example 1 except that 3-glycidoxypropyltrimethoxysilane was used instead of the reaction mixture prepared by the addition reaction of 1 mole of tetraallylpyromellitate and 1 mole of trimethoxysilane. This silicone rubber composition was cured by the same procedure as described in Example 1, and the physical properties and the bonding strength of the silicone rubber obtained were measured. These results are shown in Table 1.

TABLE 1

|  | Example | Comparison example | |
| --- | --- | --- | --- |
|  | Example 1 | Comparison example 1 | Comparison example 2 |
| Hardness (JIS A) | 63 | 40 | 66 |
| Tensile strength (kgf/cm²) | 95 | 62 | 102 |
| Elongation (%) | 320 | 715 | 350 |
| Bonding strength (kgf/cm²) | 40 | 12 | 14 |

EXAMPLE 2

100 parts by weight of an organopolysiloxane mixture, which was prepared by uniformly mixing 50 parts by weight of dimethylvinylsiloxy-capped dimethylsiloxane-methylvinylsiloxane copolymer having a viscosity of 5,000,000 centistokes (molar ratio of dimethylsiloxane unit and methylvinylsiloxane unit was 99.73/0.27) and 50 parts by weight of silanol-capped dimethylpolysiloxane having a viscosity of 20,000,000 centistokes, and 50 parts by weight of hydrophobic wet method silica, with a specific surface area of 620 m²/g consisting of $(CH_3)_2SiO_{2/2}$ units and $SiO_{4/2}$ units, were mixed while heating at 150° C. for 1 hour using a kneader-mixer, and a base compound was prepared. 100 parts by weight of this base compound, 1.25 parts by weight of o-chlorobenzoylperoxide, and 1.5 parts by weight of a reaction mixture prepared by the addition reaction of 1 mole of tetraallylpyromellitate and 1 mole of triethoxysilane in the presence of platinum catalyst, were uniformly mixed and kneaded using a two-roll mill to prepare the silicone rubber composition of the present invention.

This silicone rubber composition was sandwiched between 2 sheets of polypropylene film, and using a calender roll, a silicone rubber composition film 1.0 mm thick was fabricated. This silicone rubber composition film was peeled from the polypropylene film and sandwiched between the substrate materials shown in Table 2 (1 mm×25 mm×60 mm) in such a way that the adhesion area was 25 mm×10 mm, and then this was heated for one minute using a hot press under the conditions of 3 kg/cm² pressure and a temperature of 100° C. to fabricate a test piece bonded with silicone rubber. The bonding strength of this test piece was measured according to the tensile-shear bonding strength test method for adhesives specified in JIS K 6850. These results are shown in Table 2.

Comparison example 3

A silicone rubber composition was prepared by the same procedure as described in Example 2 except that triallyltrimellitate was used instead of the reaction mixture prepared by the addition reaction of 1 mole of tetraallylpyromellitate and 1 mole of triethoxysilane as described in Example 2. This silicone rubber composition was formed into a sheet by the same procedure as described in Example 2, and its bonding strength was measured. The results are shown in Table 2.

TABLE 2

| Bonding strength (kgf/cm²) | Present invention Example 2 | Comparison example Comparison example 3 |
|---|---|---|
| Iron | 62 | 35 |
| Stainless steel (SUS304) | 51 | 33 |
| Aluminum | 60 | 36 |
| Polyester resin | 46 | 25 |
| Epoxy resin | 55 | 20 |
| Polybutyleneterephthalate resin | 43 | 25 |

I claim:

1. A silicone rubber composition comprising:

(A) 100 parts by weight of an organopolysiloxane described by average unit formula $$R^1_n SiO_{(4-n)/2}$$

where $R^1$ is a substituted or an unsubstituted monovalent hydrocarbon group, and n is a number of 1.9 to about 2.1, (B) 0.1 to about 10 parts by weight of an organic peroxide, and (C) 0.1 to about 10 parts by weight of an addition reaction product or a reaction mixture of (i) a carboxylic acid ester described by general formula $$(C_6H_{6-x}) \left[ \begin{array}{c} O \\ \| \\ -C-O-R^2 \end{array} \right]_x,$$

where $R^2$ is an alkenyl group and x is a number of 1 to 6, and (ii) an alkoxysilane expressed by general formula $$\begin{array}{c} R^3_{(3-a)} \\ | \\ HSi(OR^4)_a, \end{array}$$

where $R^3$ is a monovalent hydrocarbon group which does not contain aliphatic unsaturated linkage, $R^4$ is an alkyl group, and a is a number of 1 to 3.

2. A silicone rubber composition comprising:

(A) 100 parts by weight of an organopolysiloxane described by average unit formula $$R^1_n SiO_{(4-n)/2}$$

where $R^1$ is a substituted or an unsubstituted monovalent hydrocarbon group, and n is a number of 1.9 to about 2.1, (B) 0.1 to about 10 parts by weight of an organic peroxide, (C) 0.1 to about 10 parts by weight of an addition reaction product or a reaction mixture of (i) a carboxylic acid ester described by general formula $$(C_6H_{6-x}) \left[ \begin{array}{c} O \\ \| \\ -C-O-R^2 \end{array} \right]_x,$$

where $R^2$ is an alkenyl group and x is a number of 1 to 6, and (ii) an alkoxysilane expressed by general formula $$\begin{array}{c} R^3_{(3-a)} \\ | \\ HSi(OR^4)_a, \end{array}$$

where $R^3$ is a monovalent hydrocarbon group which does not contain aliphatic unsaturated linkage, $R^4$ is an alkyl group, and a is a number of 1 to 3, and (D) 1 to about 300 part by weight of a reinforcing filler with a specific surface area of 50 m²/g or greater.

3. A silicone rubber composition according to claim 1, where the organic peroxide has a one minute half-life decomposition temperature less than or equal to 125° C.

4. A silicone rubber composition according to claim 2, where the organic peroxide has a one minute half-life decomposition temperature less than or equal to 125° C.

5. A silicone rubber composition according to claim 1, where the organopolysiloxane has a viscosity at 25° C. of 1,000,000 centistokes or greater.

6. A silicone rubber composition according to claim 2, where the organopolysiloxane has a viscosity at 25° C. of 1,000,000 centistokes or greater.

7. A silicone rubber composition according to claim 1, where the organopolysiloxane has a viscosity in a range of 5,000,000 to about 50,000,000 centistokes at 25° C.

8. A silicone rubber composition according to claim 2, where the organopolysiloxane has a viscosity in a range of 5,000,000 to about 50,000,000 centistokes at 25° C.

9. A silicone rubber composition according to claim 1, where the organic peroxide comprises 0.5 to about 5 parts by weight per 100 parts by weight of the organopolysiloxane.

10. A silicone rubber composition according to claim 2, where the organic peroxide comprises about 0.5 to 5 parts by weight per 100 parts by weight of the organopolysiloxane.

11. A silicone rubber composition according to claim 1, where $R^2$ is allyl, x is 3 or 4, $R^3$ is methyl or phenyl, $R^4$ is methyl or ethyl, and a is 3.

12. A silicone rubber composition according to claim 2, where $R^2$ is allyl, x is 3 or 4, $R^3$ is methyl or phenyl, $R^4$ is methyl or ethyl, and a is 3.

13. A silicone rubber composition according to claim 1 comprising 0.2 to 5 parts by weight of the (C) constituent per 100 parts by weight of the organopolysiloxane.

14. A silicone rubber composition according to claim 1 comprising 0.2 to 5 parts by weight of the (C) constituent per 100 parts by weight of the organopolysiloxane.

15. A silicone rubber composition according to claim 2, where the reinforcing filler has a specific surface area of 100 $m^2/g$ or greater.

16. A silicone rubber composition according to claim 2 comprising 10 to about 200 parts by weight of the reinforcing filler per 100 parts of the organopolysiloxane.

* * * * *